United States Patent
Klanderman et al.

[11] 3,960,748
[45] *June 1, 1976

[54] NEMATIC LIQUID CRYSTAL COMPOSITIONS

[75] Inventors: Bruce H. Klanderman; Richard T. Klingbiel, Rochester, both of, N.Y.

[73] Assignee: Eastman Kodak Company, Rochester, N.Y.

[ * ] Notice: The portion of the term of this patent subsequent to Mar. 18, 1992, has been disclaimed.

[22] Filed: Nov. 12, 1973

[21] Appl. No.: 415,197

Related U.S. Application Data

[63] Continuation-in-part of Ser. No. 300,007, Oct. 24, 1972, abandoned.

[52] U.S. Cl............................ 252/299; 350/160 LC
[51] Int. Cl.$^2$...................... C09K 3/34; G02F 1/13
[58] Field of Search................... 252/299, 408 LC; 250/160 LC

[56] References Cited
UNITED STATES PATENTS

| | | | |
|---|---|---|---|
| 3,540,796 | 11/1970 | Goldmacher et al. | 350/160 LC |
| 3,675,987 | 7/1972 | Rafuse | 252/299 |
| 3,738,942 | 6/1973 | Matsumoto et al. | 252/299 |
| 3,756,694 | 9/1973 | Soree et al. | 252/408 LC |
| 3,826,757 | 7/1974 | Wong | 252/408 |
| 3,872,140 | 3/1975 | Klanderman et al. | 252/408 |

FOREIGN PATENTS OR APPLICATIONS

| | | | |
|---|---|---|---|
| 2,024,269 | 12/1971 | Germany | 252/299 |
| 1,170,486 | 11/1969 | United Kingdom | 252/299 |

*Primary Examiner*—Benjamin R. Padgett
*Assistant Examiner*—Teddy S. Gron
*Attorney, Agent, or Firm*—H. M. Chapin

[57] ABSTRACT

A nematic liquid crystal composition having a resistivity of about $1 \times 10^8$ to $1 \times 10^{10}$ ohm-cm and a broad mesophase comprising a mixture prepared by transiminization between at least one Schiff base compound of the formula

I.

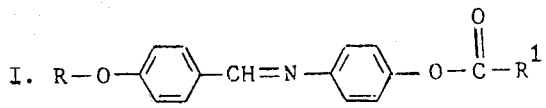

and at least one other Schiff base of the formula:

II.

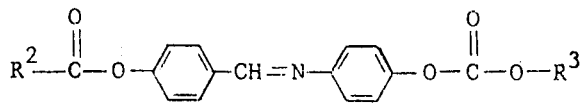

wherein R, $R^1$, $R^2$ and $R^3$ are alkyl radicals having 1 to 18 carbon atoms. Advantageously the Schiff bases I and II are subjected to transiminization at a molar ratio of about 5/1 to 1/5.

7 Claims, No Drawings

NEMATIC LIQUID CRYSTAL COMPOSITIONS

This application is a continuation-in-part of our abandoned application Ser. No. 300,007, filed Oct. 24, 1972, the disclosure of which is incorporated by reference herein.

This application relates to liquid crystal compositions, and more particularly, to nematic liquid crystal compositions useful in electro-optical devices.

Liquid crystal compositions are used in various electro-optical devices which involve the modulation of electromagnetic radiation, such as light valves and transmissive or reflective optical display devices. Such light valves are controlled by an electric or a magnetic field and operate when the liquid crystal material is in its mesomorphic state.

Mesomorphism has been described as a state of matter with molecular order between that of a crystalline solid and a normal liquid. Crystalline solids are characterized by a non-random distribution of the molecules and a three-dimensional order in the location of the individual molecules within the crystal lattice. Normal liquids generally show isotropic behavior, for example, to light, due to the fact that the molecules of the liquid are randomly oriented.

In the mesomorphic state or mesophase of liquid crystal compositions, which are comprised of rod-shaped molecules, the directional arrangement of at least a part of the molecules is non-random. Among the various types of liquid crystal compositions, nematic liquid crystals are characterized by the fact that the long axes of the molecules maintain a parallel or nearly parallel arrangement to each other such that a one-dimensional order exists. Nematic liquid crystal compositions are usually characterized by a turbid appearance.

The mesophases of liquid crystal compositions exist over a temperature range which is dependent on the specific nature of the composition and molecular structure. Below this range the compositions become crystalline solids and above this range the preferred directional alignment of the molecules is destroyed and a normal liquid having isotropic behavior results. Both of these phase changes are characterized by sharp transition points.

In the mesomorphic state, the anisotropic properties of the individual molecules are conferred upon the bulk material. In regard to dielectric properties, the dielectric constant parallel to the long axis of the molecules can be larger or smaller than the dielectric constant perpendicular to the long axis of the molecules.

One of the main electro-optical applications of some nematic liquid crystal compositions is based on the fact that the molecules of such compositions exhibit a high dielectric constant perpendicular to their long axis, because the dipole moment perpendicular to the long axis of the long molecules is greater than the dipole moment in the parallel direction. Such molecules are said to possess negative dielectric anisotropy.

The molecules can be aligned perpendicularly or uniaxially parallel to a surface giving a transparent appearance, and when an external magnetic or electric field is applied above a threshold value perpendicular to the surface orientation of the molecules, the molecules tend to orient perpendicularly to this field. However, this orientation is impeded by the presence of ions moving in the field which cause constant movement of the liquid crystal molecules (these molecules behaving as groups about $10^{-5}$ cm, in size) which is a dynamic state resulting in the scattering of light. Thus, the application of an electric or magnetic field brings about a change from a relatively transparent optical state to a translucent dynamic scattering state. This effect is referred to as the dynamic scattering effect.

The nematic mesophase of a specific liquid crystalline compound is generally restricted within a relatively narrow temperature range. However, it is possible to broaden the temperature range of the mesophase of the nematic liquid crystal composition by utilizing mixtures of different species of nematic liquid crystals.

Where the use of a liquid crystal composition is dependent on the dynamic scattering effect, the temperature of the device must be within the temperature limits of its mesophase. However, under certain circumstances, liquid crystal mixtures can operate several degrees below the solid crystal-mesomorphic transition temperature if the liquid crystal mixture is in a supercooled state.

Many prior art liquid crystal compositions, such as those disclosed in U.S. Pat. No. 3,540,796, have a relatively high solid crystal-mesomorphic transition point. In the case of these latter prior art liquid crystal compositions, heat must be applied to keep the compositions in the mesophase below about room temperature. Other prior art liquid crystal compositions exhibit relatively poor stability of the liquid crystal molecules. Examples of such relatively unstable liquid crystal compositions are disclosed in Applied Physics Letter 18 (14) page 127 (1971) by M. Schadt and W. Helfrich. This publication discloses liquid crystals formed by cyano-group substituted Schiff bases whose azomethine linkage is easily split.

Examples of prior art Schiff bases having negative dielectric anisotropy are disclosed in German Offenlegungsschrift No. 2,017,727. These Schiff bases include mixtures of alkyl and alkoxy substituents and are generally susceptible to hydrolytic cleavage.

The present invention relates to nematic liquid crystal compositions having resistivities of about $1 \times 10^8$ to $1 \times 10^{10}$ ohm-cm comprised predominantly (based on the weight of such compositions) of mixtures prepared by transiminization between at least one Schiff base compound of the formula:

Compound I 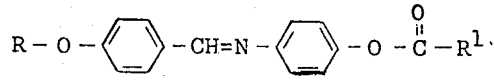

wherein R and $R^1$ are alkyl radicals of 1 to 18 carbon atoms, and at least one Schiff base compound of the formula:

Compound II 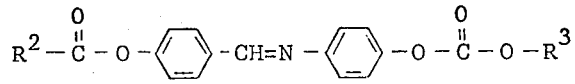

wherein $R^2$ and $R^3$ are alkyl radicals of 1 to 18 carbon atoms.

By transiminization is meant the reversible formation and cleavage of the imine linkages of at least two Schiff bases in which the aldehyde and amine portions interchange with one another. Referring to Compounds I and II, for the purposes of the above definition, the portion of each molecule extending from the left end to and including the —CH= represents the aldehyde portion of the molecule; and the portion of each molecule extending from the right end to and including the =N— represents the amine portion of the molecule.

Electro-optical devices using nematic liquid crystal compositions of the invention represent technical applications of the dynamic scattering effect. The term "dynamic scattering effect" within the context of this invention is to convey the meaning that the nematic liquid crystal compositions of the invention are characterized by, a negative dielectric anisotropy, a perpendicular or uniaxially parallel orientation of the liquid crystal molecules with respect to an electrode surface, and an electrical resistivity of about $1 \times 10^8$ to $1 \times 10^{10}$ ohm-cm. The nematic liquid crystal compositions of the invention are further characterized by having a mesophase temperature range that is at least 100°C in extent and that encompasses room temperature (e.g., a range of 0° to 100°C or of 10° to 120°C, or of —10° to 105°C and so forth). Such compositions can thus be utilized at ambient temperatures without additional heating, and they do not require the careful temperature control needed for compositions having narrower mesophase temperature ranges. In addition, the present nematic liquid crystal compositions have relatively good stability to hydrolytic cleavage.

The nematic liquid crystal compositions of the invention have a negative dielectric anisotropy which makes the compositions useful in dynamic scattering devices. The long axis of the negative liquid crystal orients perpendicular to an applied electric field in the absence of ionic conducting species. Turbulence associated with dynamic scattering of light results, however, when sufficient ions are present. Thus in the dynamic scattering mode, the nematic liquid crystal composition must also possess a resistivity of $1 \times 10^8$ to $1 \times 10^{10}$ ohm-cm which can be obtained by adding to a mixture of pure materials suitable organic salts such as quaternary nitrogen salts, e.g. tetrabutyl ammonium perchlorate, dodecylisoquinolinium bromide and the like. The amount of ionic addenda utilized to obtain the desired conductivity would vary with the purity of the transiminization mixture, oftentimes residual transiminization catalyst present in the composition being sufficient to impart the appropriate conductivity.

R and $R^1$ of Compound I are alkyl radicals, suitably having 1 to 18 carbon atoms, more generally 1 to 12 carbon atoms, and preferably 1 to 8 carbon atoms. R and $R^1$ can be the same or different, but preferably R and $R^1$ are different. Examples of Compound I include p-[(p-methoxybenzylidene)amino]-phenyl butyrate, p-[(p-methoxybenzylidene)amino]phenyl stearate, p[(p-butoxybenzylidene)amino] phenyl propionate, and p[(p-octadecoxybenzylidene)amino] phenyl acetate.

$R^2$ and $R^3$ of Compound II are alkyl radicals, suitably having 1 to 18 carbon atoms, more generally 1 to 12 carbon atoms, and preferably 1 to 8 carbon atoms. $R^2$ and $R^3$ can be the same or different, but preferably $R^2$ and $R^3$ are different. Examples of Compound II include N-(p-valeryloxybenzylidene)-p-pentoxy-carbonyloxyaniline, N-(p-acetyloxybenzylidene)-p-octadecoxycarbonyloxyaniline, N-(p-valeryloxybenzylidene)-p-methoxycarbonyloxyaniline, and N-(p-octadecanoyloxybenzylidene)-p-methoxycarbonyloxyaniline.

Compound I and Compound II are Schiff bases which are compounds which contain an azomethine moiety —CH=N— (also known as an imine linkage) having a carbon atom directly attached at either end of such moiety.

Preferably, the compounds used in the nematic liquid crystal compositions of the invention are prepared by conventional methods and purified by careful recrystallization until a constant and reversible mesomorphic range is attained. The extraneous color of each compound is reduced to a minimum to achieve a mixture with a minimum of extraneous color.

The liquid crystal compositions of this invention comprise predominantly by weight a transiminized (interconverted) mixture of Compounds I and II which are Schiff bases, although such compositions more generally comprise at least about 80 percent by weight of, and preferably consist essentially of, the transiminization products of Compounds I and II. The transiminization takes place at the azomethine linkages of Compounds I and II and gives a mixture of all possible Schiff bases containing the ester, carbonate and ether components of the original Schiff bases. The transminization can be effected by heating a mixture of Compounds I and II. More than one Schiff base of the formula of Compound I or II can be used in preparing the present nematic liquid crystal compositions. Typically the molar ratios of Compound I to Compound II before transiminization vary from about 5/1 to 1/5, with 3 molar parts of Compound I to 1 molar part of Compound II being preferred. The mixture of Compounds I and II is heated to effect transiminization. A useful temperature range for heating the mixture is from about 50° to about 120°C. Higher temperatures can be used in order to shorten the reaction time. However, the temperature should not exceed the temperature of decomposition of the ingredients or the reaction products. Typically, the reaction mixture is heated to a suitable elevated temperature for a period of time which can vary from several minutes to several days. Reaction times vary with such factors as purity of materials, reaction temperature, amounts of reactants, and the presence of catalysts.

The transiminization process can be conducted in the presence of a catalyst. In some cases, the catalyst substantially increases the rate of transiminization. Typical catalysts include alkylamine salts (e.g., triethylamine hydrochloride), ammonium chloride, sodium acetate, ammonium acetate, and the like. In addition, small amounts of water can facilitate the reaction. After the transiminization process, the resulting mixture is thereafter "worked-up" or purified in accordance with usual chemical practice to remove materials such as catalyst materials that might adversely affect the desired resistivity of the mixture. However, small amounts of residual catalyst material can be utilized to obtain the desired resistivity of the mixture. Various ionic materials as disclosed above can also be added to impart the desired resistivity to the mixture.

The following examples are included for a further understanding of the invention.

EXAMPLE I

A mixture of 2 molar parts of p-[(p-methoxybenzylidene) amino] phenyl butyrate, 1 molar part of p[(p-butoxybenzylidene) amino]phenyl propionate and 1 molar part of N-(p-valeryloxybenzylidene)-p-pentoxycarbonyloxyaniline (respectively compounds numbers 1, 2, and 3 below) were combined with 0.4% by weight of purified triethylamine hydrochloride as a transiminization catalyst and heated at 80°C for 4 hours. The reaction mixture was diluted with a large amount of benzene and then filtered twice through a fine sintered-glass funnel. The benzene was removed under vacuum. Sufficient transiminization catalyst remained in the resulting nematic liquid crystal composition to impart thereto a resistivity of about $2 \times 10^9$ ohm-cm. A suitable resistivity of $2.7 \times 10^8$ ohm-cm can also be imparted to the transiminized mixture if further purified with cyclohexane, as was done with the benzene, by adding to the mixture $4 \times 10^{-5}$ mole of tetrabutylammonium perchlorate per mole of mixture. The resulting composition had a mesophase temperature range of −5° to 103°C; and $\Delta\epsilon$ of −1.668. $\Delta\epsilon = \epsilon - \epsilon$. $\epsilon$ and $\epsilon$ represent values for the dielectric constant ($\epsilon$) when the long axis of the nematic crystal is parallel ( ) or perpendicular ( ) to the electric field. In the supercooled state, this composition exhibits its liquid crystal properties at −20°C. Analysis indicates a nine-component equilibrium mixture consisting essentially of the following compounds:

\* These data were obtained with a vapor phase chromatographic unit. The area percent for each peak on the resulting graph was then determined. The identity of each peak was established with a gas phase chromatograph-mass spectrometer unit. When the nematic liquid crystal composition is placed between two glass plates having transparent conductive surfaces at 25°C, and $10^4$ volts/cm of direct current electric field is applied, strong light scattering is observed. The composition has substantial stability to hydrolytic cleavage.

EXAMPLE II

A mixture of 2 molar parts of above compound 1, 1 molar part of above compound 2, and 1 molar part of N-p-valeryloxybenzylidene-p-methoxycarbonyloxyaniline (compound 10 below) were combined with 0.4% by weight of purified triethylamine hydrochloride as a transiminization catalyst and heated at 80°C for 4 hours. The reaction mixture was diluted with benzene and filtered through a sintered-glass funnel. The benzene was removed under vacuum. Sufficient transiminization catalyst remained in the resulting nematic liquid crystal composition to impart a resistivity of $1 \times 10^9$ ohm-cm. The resulting composition had a mesophase temperature range of 3° to 108°C. Analysis indicated a nine-component mixture consisting essentially of compounds 1, 2, 4, 5, 8, 9 and the following compounds:

| # | Compound | Area % * |
|---|---|---|
| 1. | $CH_3O-\phi-CH=N-\phi-OC(O)-C_3H_7$ | 24 |
| 2. | $C_4H_9O-\phi-CH=N-\phi-OC(O)-C_2H_5$ | 9 |
| 3. | $C_4H_9C(O)-O-\phi-CH=N-\phi-OCO-C_5H_{11}$ | 5 |
| 4. | $CH_3O-\phi-CH=N-\phi-OC(O)-C_2H_5$ | 11 |
| 5. | $C_4H_9O-\phi-CH=N-\phi-OC(O)-C_3H_7$ | 27 |
| 6. | $CH_3O-\phi-CH=N-\phi-OCO-C_5H_{11}$ | |
| 7. | $C_4H_9O-\phi-CH=N-\phi-OCO-C_5H_{11}$ | 8 |
| 8. | $C_4H_9C(O)-O-\phi-CH=N-\phi-OC(O)-C_2H_5$ | 4 |
| 9. | $C_4H_9C(O)-O-\phi-CH=N-\phi-OC(O)-C_3H_7$ | 12 |

10. 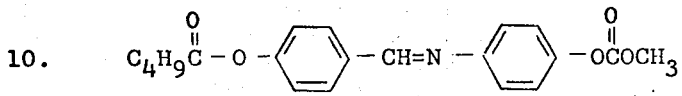

11. 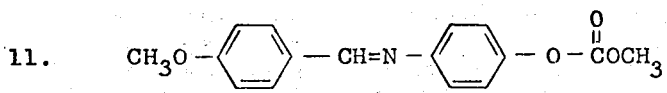

12. 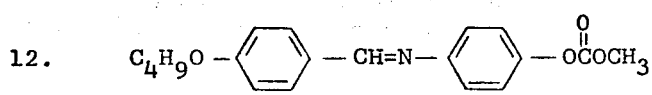

The prepared nematic liquid crystal composition has substantial stability to hydrolytic cleavage and shows strong light scattering when placed in an electric field between transparent conductive surfaces as described in Example I.

As used herein: —$CH_3$ refers to a methyl radical, —$C_2H_5$ refers to an ethyl radical, —$C_3H_7$ refers to a n-propyl radical, —$C_4H_9$ refers to a n-butyl radical and —$C_5H_{11}$ refers to a n-pentyl radical.

Reference is made to three other U.S. patent applications which are assigned to Eastman Kodak Company like the present application, and which relate to liquid crystals:

A. Ser. No. 300,008 (abandoned)
Filed: Oct. 24, 1972
Inventors: Bruce H. Klanderman and David P. Maier
Title: Liquid Crystal Compositions
a continuation-in-part of which was filed Nov. 12, 1973 as Ser. No. 415,196.

Describes and claims a nematic liquid crystal composition comprising a mixture of the composition of the present invention, with at least one compound having the formula:

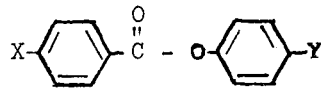

wherein X and Y are $R^4$, $R^4$—O—, $R^4$-C-O-, $R^4$-O-C-O-, or —CN. When X is —CN, then Y is one of the other radicals indicated, and vice versa. Each $R^4$ is an alkyl radical of 1 to 12 carbon atoms.

The compositions of Ser. No. 415,196 are characterized by a positive dielectric anisotropy which makes the compositions useful in display devices which are based on a field effect.

B. Serial No. 331,438
Filed Feb. 12, 1973
Inventors: Bruce H. Klanderman and T. R. Criswell
Title: Liquid Crystalline Compositions And Method
U.S. Pat. No. 3,872,140, granted Mar. 18, 1975.

Describes and claims a method for forming mixtures of Schiff bases wherein at least two different Schiff bases are mixed together and heated in the presence of a catalyst to effect transiminization.

C. Ser. No. 388,516
Filed: Aug. 15, 1973
Inventors: James P. Van Meter and Bruce H. Klanderman
Title: Liquid Crystalline Compounds and Compositions
U.S. Pat. No. 3,915,883, granted Oct. 28, 1975.

Describes and claims an electro-optical cell comprising a film of liquid crystalline compounds which are substituted phenyl p-benzoyloxy-benzoates. It also claims the substituted phenyl p-benzoyloxybenzoate compound.

The invention has been described in detail with particular reference to preferred embodiments thereof, but it will be understood that variations and modifications can be effected within the spirit and scope of the invention.

We claim:

1. In a nematic liquid crystal composition having a resistivity of about $1 \times 10^8$ to $1 \times 10^{10}$ ohm-cm, the improvement wherein said composition comprises predominantly by weight a mixture resulting from the transiminization reaction between at least one Schiff base of the formula:

I:

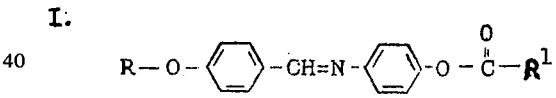

and at least one Schiff base of the formula:

II.

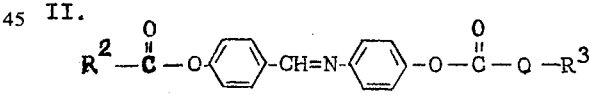

wherein R, $R^1$, $R^2$ and $R^3$ are alkyl radicals having 1 to 18 carbon atoms.

2. A nematic liquid crystal composition according to claim 1 wherein Schiff bases I and II are subjected to transiminization at a molar ratio of about 5/1 to 1/5.

3. A nematic liquid crystal composition according to claim 1 wherein two different Schiff bases of formula I are subjected to transiminization with said at least one Schiff base of formula II in preparing said composition.

4. A nematic liquid crystal composition according to claim 1 wherein R, $R^1$, $R^2$ and $R^3$ are alkyl radicals having 1 to 8 carbon atoms.

5. A nematic liquid crystal composition according to claim 1 wherein R is —$CH_3$ or —$C_4H_9$, $R^1$ is —$C_3H_7$ or —$C_2H_5$, $R^2$ is $C_4H_9$ and $R^3$ is —$C_5H_{11}$ or —$CH_3$.

6. A nematic liquid crystal composition according to claim 1 consisting essentially of a mixture of:

1. $CH_3O-\langle\phantom{x}\rangle-CH=N-\langle\phantom{x}\rangle-OC(=O)-C_3H_7$, 2. $C_4H_9O-\langle\phantom{x}\rangle-CH=N-\langle\phantom{x}\rangle-OC(=O)-C_2H_5$, 3. $C_4H_9C(=O)-O-\langle\phantom{x}\rangle-CH=N-\langle\phantom{x}\rangle-OCO-C_5H_{11}$, 4. $CH_3O-\langle\phantom{x}\rangle-CH=N-\langle\phantom{x}\rangle-OC(=O)-C_2H_5$, 5. $C_4H_9O-\langle\phantom{x}\rangle-CH=N-\langle\phantom{x}\rangle-OC(=O)-C_3H_7$, 6. $CH_3O-\langle\phantom{x}\rangle-CH=N-\langle\phantom{x}\rangle-OCO-C_5H_{11}$, 7. $C_4H_9O-\langle\phantom{x}\rangle-CH=N-\langle\phantom{x}\rangle-OCO-C_5H_{11}$, 8. $C_4H_9C(=O)-O-\langle\phantom{x}\rangle-CH=N-\langle\phantom{x}\rangle-OC(=O)-C_2H_5$, and 9. $C_4H_9C(=O)-O-\langle\phantom{x}\rangle-CH=N-\langle\phantom{x}\rangle-OC(=O)-C_3H_7$.

7. A nematic liquid crystal composition according to claim 1 consisting essentially of a mixture of:

1. $CH_3O-\langle\phantom{x}\rangle-CH=N-\langle\phantom{x}\rangle-OC(=O)-C_3H_7$, 2. $C_4H_9O-\langle\phantom{x}\rangle-CH=N-\langle\phantom{x}\rangle-OC(=O)-C_2H_5$, 3. $CH_3O-\langle\phantom{x}\rangle-CH=N-\langle\phantom{x}\rangle-OC(=O)-C_2H_5$, 4. $C_4H_9O-\langle\phantom{x}\rangle-CH=N-\langle\phantom{x}\rangle-OC(=O)-C_3H_7$, 5. $C_4H_9CO(=O)-\langle\phantom{x}\rangle-CH=N-\langle\phantom{x}\rangle-OC(=O)-C_2H_5$, 6. 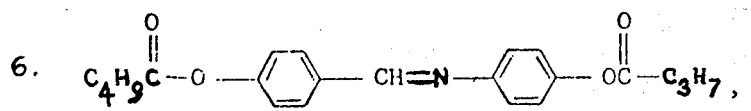
7. 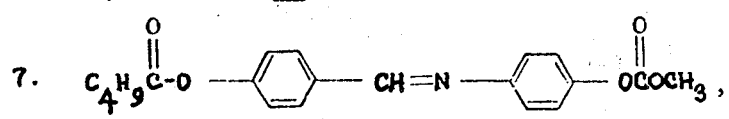
8. 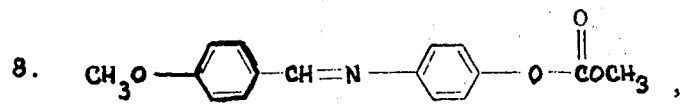
9. 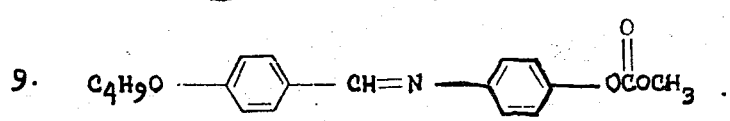
* * * * *

UNITED STATES PATENT AND TRADEMARK OFFICE
CERTIFICATE OF CORRECTION

PATENT NO. : 3,960,748
DATED : June 1, 1976
INVENTOR(S) : Bruce H. Klanderman and Richard T. Klingbiel It is certified that error appears in the above-identified patent and that said Letters Patent are hereby corrected as shown below:

Column 5, lines 23-26 should read as follows:

$-5°$ to $103°C$; and $\Delta \varepsilon$ of $-1.668$. $\Delta \varepsilon = \varepsilon_{\parallel} - \varepsilon_{\perp}$. $\varepsilon_{\parallel}$ and $\varepsilon_{\perp}$ represent values for the dielectric constant ($\varepsilon$) when the long axis of the nematic crystal is parallel ($\parallel$) or perpendicular ($\perp$) to the electric field. In the super- Signed and Sealed this Ninth Day of November 1976

[SEAL]

Attest:

RUTH C. MASON
Attesting Officer

C. MARSHALL DANN
Commissioner of Patents and Trademarks